No. 733,756. PATENTED JULY 14, 1903.
H. C. SNOOK.
STEREOSCOPIC APPARATUS.
APPLICATION FILED DEC. 4, 1902.
NO MODEL. 2 SHEETS—SHEET 1.

Witnesses:-
Chas. D. Lon.
Hamilton D. Turner

Inventor
Homer Clyde Snook
by his Attorneys
Howson & Howson

No. 733,756. PATENTED JULY 14, 1903.
H. C. SNOOK.
STEREOSCOPIC APPARATUS.
APPLICATION FILED DEC. 4, 1902.
NO MODEL. 2 SHEETS—SHEET 2.

Witnesses:-
Chas. De Con.
Hamilton D. Turner

Inventor:-
Homer Clyde Snook,
by his Attorneys;
Howson & Howson

No. 733,756. Patented July 14, 1903.

UNITED STATES PATENT OFFICE.

HOMER CLYDE SNOOK, OF PHILADELPHIA, PENNSYLVANIA.

STEREOSCOPIC APPARATUS.

SPECIFICATION forming part of Letters Patent No. 733,756, dated July 14, 1903.

Application filed December 4, 1902. Serial No. 133,838. (No model.)

*To all whom it may concern:*

Be it known that I, HOMER CLYDE SNOOK, a citizen of the United States, residing in Philadelphia, Pennsylvania, have invented certain Improvements in Stereoscopic Apparatus, of which the following is a specification.

My invention relates to the use of Roentgen or X rays for the purpose of producing stereoscopic images; and it consists of an improved method of operation designed to produce stereoscopic images of all bodies or substances susceptible of penetration by Roentgen or X rays.

A form of apparatus suitable for carrying out my improved method is shown in the accompanying drawings, in which—

Figure 1:
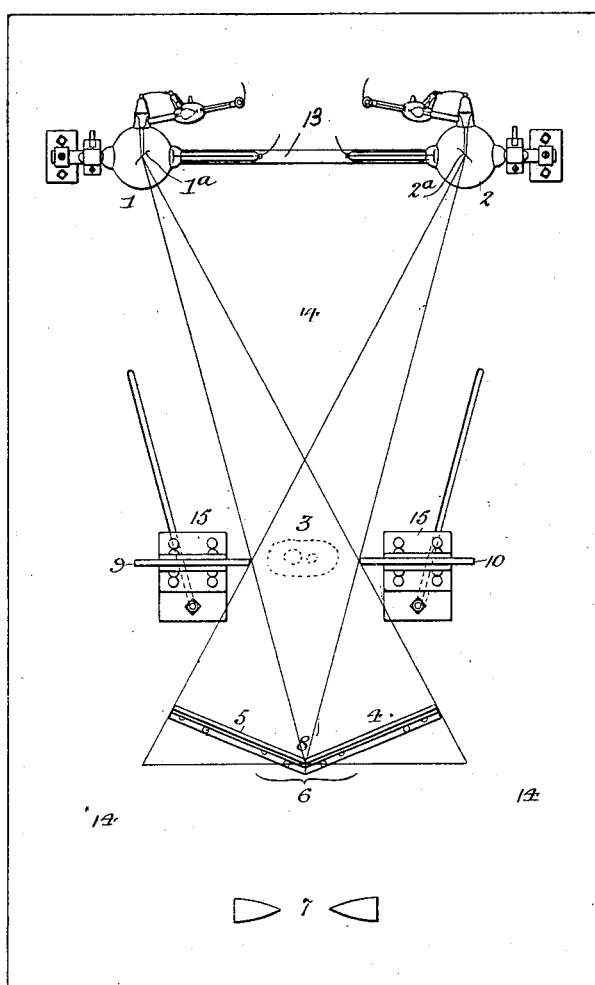
Figure 2:
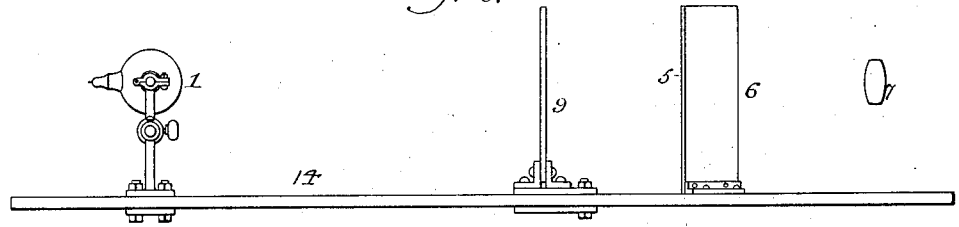
Figure 3:
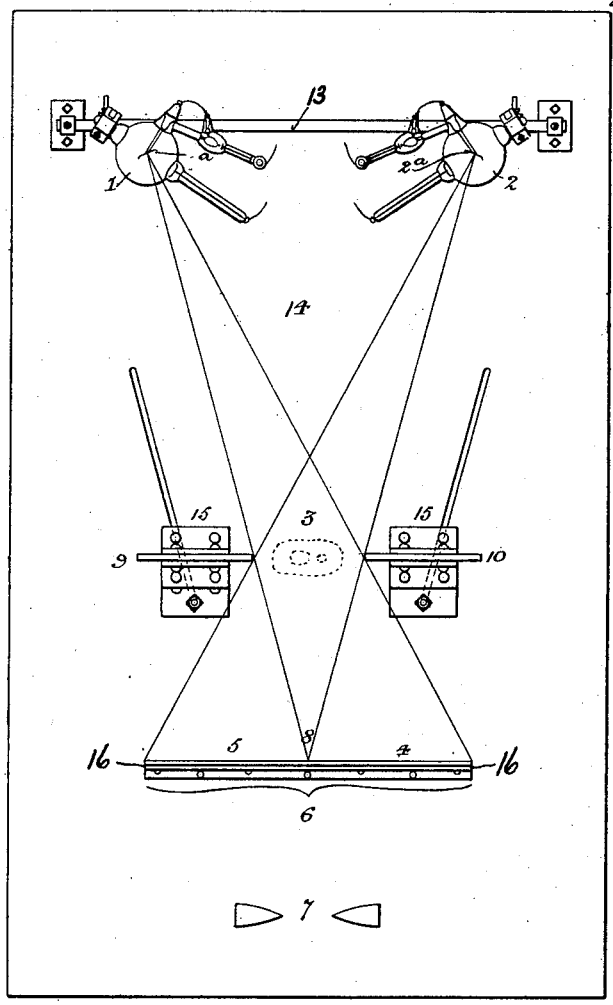
Figure 4:
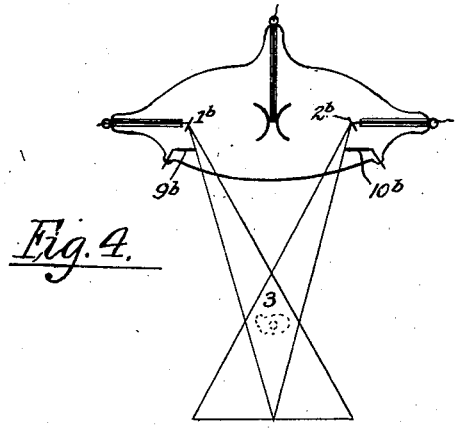

Figure 1 is a plan view of such apparatus. Fig. 2 is a side elevation of the same, partly in section. Fig. 3 is a view similar to Fig. 1, illustrating a detail of my invention; and Fig. 4 is a view illustrating a further detail of the same.

It is difficult to understand or interpret the ordinary shadows cast upon a fluoroscopic screen when using the Roentgen radiation to illuminate the screen, because these shadows lack perspective.

The purpose of this invention is to provide a simple method of producing images having a stereoscopic relation to each other by the use of Roentgen radiation. Briefly speaking, this method consists in arranging two sources of Roentgen radiation in such relation to the object to be viewed that the beams of radiation will cross each other at the point where the object is placed and will produce upon a fluoroscopic screen a pair of images side by side representing the object as viewed, respectively, by the right and left eye of the observer.

Referring now to Fig. 1, which represents a form of apparatus or mode of arranging the necessary elements capable of carrying out my improved method, two sources of Roentgen radiation, such as two Crookes or X ray tubes 1 and 2, are placed in such position with relation to each other that the general direction of the paths of the rays emitted from their anodes or anticathodes $1^a$ and $2^a$ cross each other. The object to be viewed (represented at 3) is located within the zone of the crossing rays, and the shadows cast by the object when the latter is illuminated or traversed by the beams of radiation appear at 4 and 5 upon a fluoroscopic screen 6, and may there be viewed by any form of stereoscopic optical system of lenses—such, for instance, as at 7. It will be noted that the outer lines of the beams of radiation coincide at the point 8, thereby insuring the production of a pair of images in exact stereoscopic relation to each other. At a suitable point between the source of radiation and the fluoroscopic screen, and preferably at the point where the outer line of one beam of radiation crosses the inner line of the other beam, I arrange stops 9 and 10 of some material which is non-radiable or opaque in the Roentgen radiation. It will be seen that the stop 9 is so situated that the radiation from the anode or anticathode $1^a$ cannot fall upon the portion of the fluoroscopic screen situated at 5, and yet the position of the stop 9 is such that it does not prevent the radiation from the anode or anticathode $2^a$ passing through the object at 3 and falling upon the fluoroscopic screen at 5. In like manner the stop 10 prevents radiation from $2^a$ falling upon 4, but permits radiation from $1^a$ to pass through 3 and fall upon 4. It will therefore be seen that the conditions necessary for the production of stereoscopic images are here fulfilled. The use of the stops 9 and 10 permit the continuous production of the radiation from both of the anodes or anticathodes and consequent production of two steady or persistent images upon the fluorescent screen, which can be viewed by any convenient optical system for viewing stereoscopic images. The stereoscopic screens 6 should preferably occupy the position shown in Fig. 1, so that each portion of each screen will be perpendicular or at right angles to the general direction of the beam of radiation which illuminates it.

The X-ray or Roentgen tubes 1 and 2 are carried by a suitable support 13, fixed to a base-board or stand 14. The tubes are adjustable on their brackets toward and from each other and also are capable of being turned in order to secure the proper angle of reflection of the rays. The bracket carrying the tubes is also adjustable on the base or table 14. The stereoscopic screens 6 are also adjustable in view of the adjustability of the X-ray tubes, so that said screens may be maintained at the proper angle with respect to the line of direction of the Roentgen radiation.

The stop members 9 and 10 are adjustably mounted in sliding members 15, carried by the base 14, the adjustability of these members providing for their movement toward and from each other and the slides carrying these stop members provide for the changing of the position of the same between the source of radiation and the fluoroscopic or stereoscopic screens.

I have used an apparatus such as is described above and have found that the stereoscopic effect is easily and clearly produced. By the use of the apparatus the bones of the hand or arm appeared not as flat shadows, but full, round, and in relief, with full stereoscopic perspective.

I have found by experiments conducted with the aid of this apparatus that when the angle between the two beams of rays illuminating the object is made large the perspective or depth of the stereoscopic effect is increased, and when the angle is decreased the perspective is correspondingly diminished.

Instead of using a double stereoscopic screen, as above described, a photographic plate or plates 16, as shown in Fig. 3, may be used to receive two stereoscopic images, which upon development can be viewed in a suitable stereoscopic apparatus, or prints may be made from these plates and viewed stereoscopically.

In lieu of providing the adjustable stops 9 and 10, as shown in Figs. 1 and 3, these stops may be situated within the tubes themselves, but in the latter instance they will occupy a fixed relation to the anodes or anticathodes, and hence limit the extended use of the apparatus.

The two sources of radiation may be in one tube, as illustrated, for instance, in Fig. 4, in which the anodes or anticathodes are shown at $1^b$ and $2^b$, and for some work this arrangement will be highly satisfactory. In this same view I have shown the non-radiable stops $9^b$ and $10^b$ carried by the tube and having a fixed relation to the anodes or anticathodes. The stops shown in this view are equally applicable to single tubes in the manner noted above.

The illumination of the screens is from sources of radiation of equal intensity so arranged that their beams cross, and within the zone of crossing rays the object to be viewed is placed. In order to secure equal illumination upon the screens, I preferably employ self-regulating tubes.

The optical system of stereoscopic viewing may or may not be with the aid of lenses. In fact, any stereoscopic optical system may be employed.

Having thus described my invention, I claim and desire to secure by Letters Patent—

1. The method of producing stereoscopic images by the use of Roentgen or X rays, which consists in subjecting the object to be viewed to the radiation from two sources of supply so arranged that the beams of radiation pass through said object at an angle to each other, whereby two images of said object in stereoscopic relation to each other are thrown upon a screen.

2. The method of producing stereoscopic images by the use of Roentgen or X rays, which consists in subjecting the object to be viewed to the radiation from two sources of supply so arranged that the beams of radiation pass through said object at an angle to each other, whereby two images of said object in stereoscopic relation to each other are thrown upon a fluoroscopic screen.

3. The method of producing stereoscopic images by the use of Roentgen or X rays, which consists in subjecting the object to be viewed to the radiation from two sources of supply so arranged that the beams of radiation pass through said object at an angle to each other, whereby two images of said object in stereoscopic relation to each other are thrown upon a screen, and cutting off from each image thus produced the rays which produce the opposite image.

4. The method of producing stereoscopic images by the use of Roentgen or X rays, which consists in subjecting the object to be viewed to the radiation from two sources of supply so arranged that the beams of radiation pass through said object at an angle to each other, whereby two images of said object in stereoscopic relation to each other are thrown upon a fluoroscopic screen, and cutting off from each image thus produced the rays which produce the opposite image.

5. The method of making photographic copies of stereoscopic images produced by the use of Roentgen or X rays, which consists in subjecting the object to be viewed to the radiation from two sources of supply so arranged that the beams of radiation pass through said object at an angle to each other, whereby two images of said object in stereoscopic relation to each other are thrown upon a screen, and interposing sensitized plates between said screens and the source of radiation.

6. The method of making photographic copies of stereoscopic images produced by the use of Roentgen or X rays, which consists in subjecting the object to be viewed to the radiation from two sources of supply so arranged that the beams of radiation pass through said object at an angle to each other, whereby two images of said object in stereoscopic relation to each other are thrown upon a screen, and interposing sensitized plates between said screens and the source of radiation at right
5 angles to the line of direction of said beams of radiation.

In testimony whereof I have signed my name to this specification in the presence of two subscribing witnesses.

HOMER CLYDE SNOOK.

Witnesses:
MURRAY C. BOYER,
JOS. H. KLEIN.